(12) United States Patent
Kulesha et al.

(10) Patent No.: US 7,900,873 B2
(45) Date of Patent: Mar. 8, 2011

(54) VIBRATION ISOLATION SYSTEM

(75) Inventors: Richard L. Kulesha, Bear, DE (US);
Phillip F. Lang, Hatboro, PA (US);
Rebecca M. Thomas, Laurel Springs, NJ (US)

(73) Assignee: The Boeing Company, Chicago, IL (US)

( * ) Notice: Subject to any disclaimer, the term of this patent is extended or adjusted under 35 U.S.C. 154(b) by 1150 days.

(21) Appl. No.: 11/273,971

(22) Filed: Nov. 15, 2005

(65) Prior Publication Data

US 2007/0108340 A1 May 17, 2007

(51) Int. Cl.
*B64D 37/04* (2006.01)
(52) U.S. Cl. ........... 244/135 R; 188/379; 267/136
(58) Field of Classification Search ........ 244/17.27, 244/135 R; 188/268, 379, 380, 378; 267/292, 267/293, 136, 141, 152, 153; 248/554, 555, 248/556, 557, 560
See application file for complete search history.

(56) References Cited

U.S. PATENT DOCUMENTS

| | | | | |
|---|---|---|---|---|
| 1,483,282 A * | 2/1924 | Coston | ........ | 280/93.512 |
| 2,689,698 A * | 9/1954 | Agnew | ........ | 244/123.8 |
| 2,869,811 A * | 1/1959 | Boschi | ........ | 267/141.4 |
| 2,937,040 A * | 5/1960 | Hutton | ........ | 403/227 |
| 3,966,147 A * | 6/1976 | Wittko et al. | ........ | 244/135 B |
| 4,088,042 A * | 5/1978 | Desjardins et al. | ........ | 74/574.3 |
| 4,214,738 A | 7/1980 | Casper | | |
| 4,311,213 A * | 1/1982 | Desjardins et al. | ........ | 188/380 |
| 4,362,281 A * | 12/1982 | Cresap et al. | ........ | 244/17.27 |
| 4,684,280 A * | 8/1987 | Dirkin et al. | ........ | 403/157 |
| 4,781,363 A * | 11/1988 | Braun | ........ | 267/225 |
| 4,860,972 A * | 8/1989 | Lannerd et al. | ........ | 244/135 R |
| 5,110,081 A * | 5/1992 | Lang, Jr. | ........ | 248/635 |
| 5,529,295 A * | 6/1996 | Leibach et al. | ........ | 267/140.15 |
| 5,906,254 A * | 5/1999 | Schmidt et al. | ........ | 188/378 |
| 6,149,102 A * | 11/2000 | Marasco et al. | ........ | 244/135 R |
| 6,397,988 B1 * | 6/2002 | Ptak | ........ | 188/380 |
| 6,669,393 B2 * | 12/2003 | Schilling | ........ | 403/2 |
| 6,676,116 B2 * | 1/2004 | Edberg et al. | ........ | 267/136 |
| 6,715,746 B2 * | 4/2004 | Bachmeyer et al. | ........ | 267/294 |
| 7,461,815 B2 * | 12/2008 | Almeras et al. | ........ | 244/54 |
| 2008/0136071 A1 * | 6/2008 | Weisbeck et al. | ........ | 267/136 |
| 2009/0077785 A1 * | 3/2009 | Kaneyasu et al. | ........ | 29/428 |

FOREIGN PATENT DOCUMENTS

| | | |
|---|---|---|
| GB | 2298260 | 8/1996 |
| GB | 2355780 | 5/2001 |
| GB | 2415479 | 12/2005 |

OTHER PUBLICATIONS

R. Gabel et al. "Helicopter Vibration Control By Cargo Isolation", Proc. of 20th National Forum May 1964.

* cited by examiner

*Primary Examiner* — Benjamin P Lee
(74) *Attorney, Agent, or Firm* — Haynes and Boone, LLP.

(57) ABSTRACT

Systems and techniques for isolation of external structures. A vehicle may include a vehicle body and an external structure mounted to the vehicle body. The vehicle may include a plurality of vibration isolator attachment assemblies coupling the structure to the vehicle body at a plurality of pre-selected coupling locations exterior to the structure. The plurality of vibration isolator attachment assemblies may each comprise at least one elastomer isolator.

13 Claims, 5 Drawing Sheets

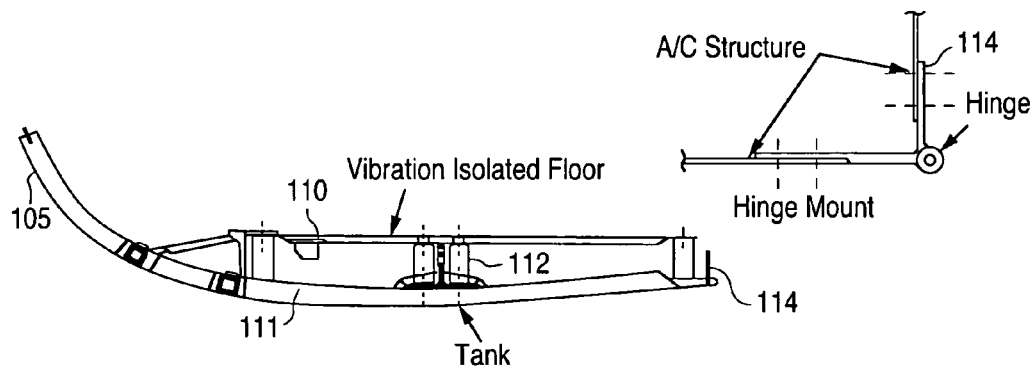
FIG. 2
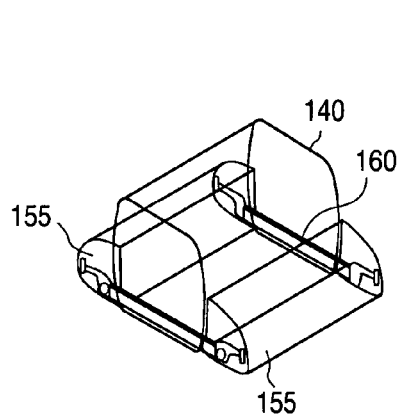
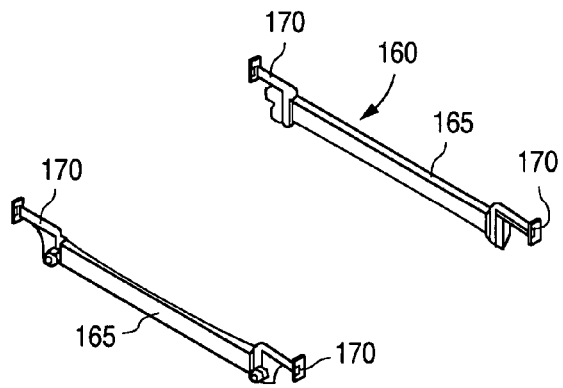
FIG. 3A  FIG. 3B

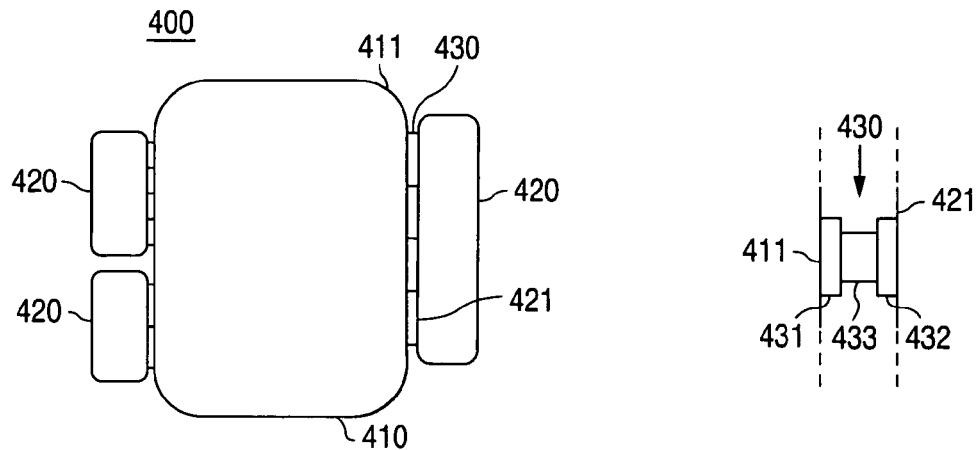
FIG. 4A
FIG. 4B
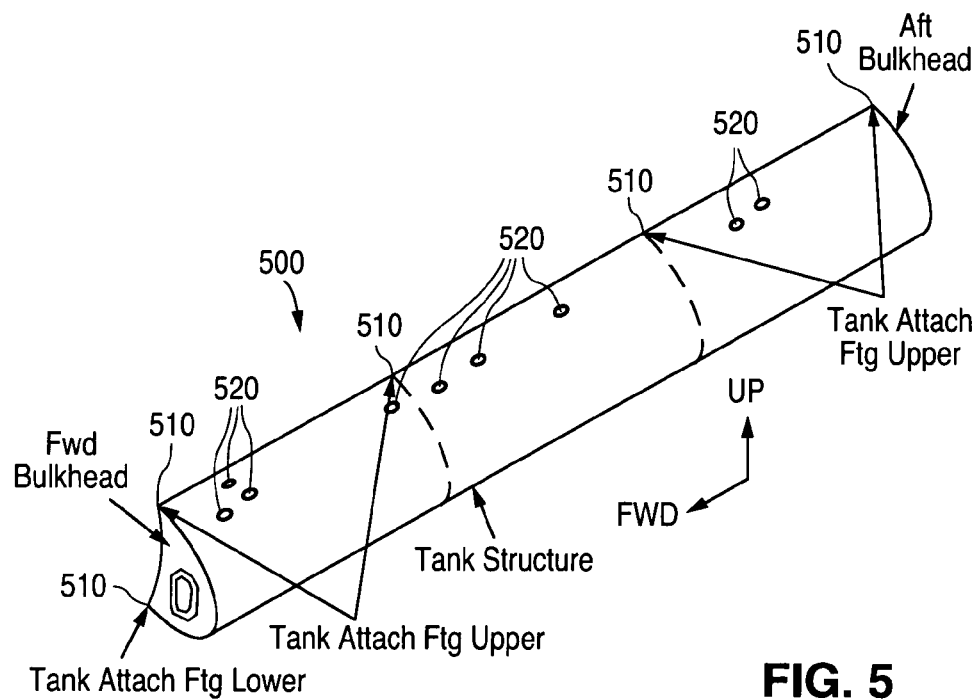
FIG. 5

US 7,900,873 B2

VIBRATION ISOLATION SYSTEM

BACKGROUND

1. Field of Invention

The present disclosure relates generally to vibration isolation, such as vibration isolation for vehicles with structures mounted external to the vehicle body.

2. Background

Mechanical vibration in a vehicle may have a number of unwanted side effects, ranging from passenger discomfort to early mechanical failure. Vibration may be particularly problematic for vehicles having one or more relatively heavy structures mounted externally to the vehicle body.

One example is a fuel tank mounted external to a helicopter fuselage. Vibrational energy generated by the rotor may be coupled to the fuel tank system. Frequencies at or close to resonant frequencies of harmonic modes of the aircraft system may be particularly problematic, since they can lead to large-amplitude oscillation. Additionally, since the mass of the fuel tank system changes during aircraft operation, the resonant frequencies also change.

In order to reduce the amount of vibration caused by this effect, a number of existing vibration isolation systems may be used. In a first example of a vibration isolation system for an externally mounted fuel tank of a helicopter, an isolated fuel cell floor is included inside the fuel tank structure. A large number of small isolators are positioned throughout the floor. The assembly of small vibration isolators acts to isolate the fuel mass from the airframe and prevents the resonance of airframe natural frequencies with rotor harmonics as the fuel weight changes.

This configuration may not be optimal. First, the vibration isolation system is incorporated on the inside of the fuel tank, reducing the available fuel storage volume. Second, the system may be heavy, complex, and difficult to install, maintain, and repair. For example, such a system may use hundreds of small isolators positioned inside the fuel tank. Replacing the small isolators requires accessing the fuel cell floor, removing it, determining the position of the isolator(s) to be replaced, and positioning replacements accurately.

Another configuration uses vibration isolation fittings between a mounting beam and the fuselage. The vibration isolation fittings each comprise a machined arm with weights and springs positioned to substantially minimize vibratory shears imparted to the beam and the fuselage, regardless of fuel weight. One such system is described in U.S. Pat. No. 4,311,213, which is hereby incorporated by reference herein. Although this system may provide good vibration isolation, it is expensive, complex, and heavy.

SUMMARY

In general, in one aspect a vehicle may include a vehicle body and a structure mounted to the vehicle body exterior to the vehicle body. In operation, the structure may have a first weight at a first time and a second different weight at a second different time. The vehicle may further include a plurality of vibration isolator attachment assemblies coupling the structure to the vehicle body at a plurality of pre-selected coupling locations exterior to the structure. The plurality of vibration isolator attachment assemblies each comprising at least one isolator comprising an elastomer material.

The vibration isolator attachment assemblies may comprise a vehicle body attachment, a structure attachment, and an associated at least one isolator non-rigidly coupling the vehicle body attachment and the structure attachment. The at least one isolator may comprise an elastomer material. In some aspects, the at least one isolator may be a single isolator, which may have a single elastomer material, or multiple elastomer materials. The at least one isolator may be multiple isolators that may each be the same or at least one may be different.

In general, in another aspect, a vehicle may comprise a vehicle body and a structure mounted to the vehicle body exterior to the vehicle body. The vehicle may further comprise a mounting system comprising a plurality of vibration reduction mounts, each comprising mounting hardware associated with the vehicle body and mounting hardware associated with the structure. The vibration reduction mounts may each further include at least associated one vibration isolator non-rigidly connecting the mounting hardware associated with the vehicle body and the mounting hardware associated with the structure. The plurality of vibration reduction mounts may be configured and positioned to substantially isolate vibrations of the structure from the vehicle body in operation.

In general, in another aspect, an aircraft may comprise a fuselage and a fuel tank mounted externally to the fuselage using a plurality of attachment mechanisms positioned at an associated plurality of locations. A first attachment mechanism may include a fuselage fitting, a fuel tank fitting, and at least one elastomer vibration isolator non-rigidly coupling the fuselage fitting to the fuel tank fitting.

These and other features and advantages of the present invention will be more readily apparent from the detailed description of the exemplary implementations set forth below taken in conjunction with the accompanying drawings.

BRIEF DESCRIPTION OF THE DRAWINGS

FIG. 2 is a cross-sectional side view of a portion of a short range fuel tank incorporating a first vibration isolation system, according to the prior art;

FIGS. 3A and 3B are perspective views of a portion of an aircraft incorporating a second vibration isolation system and the vibration isolation system, according to the prior art;

FIG. 4A is a cross-sectional top view of a portion of a vehicle incorporating a vibration isolation system, according to some embodiments;

FIG. 4B is a cross-sectional side view of an attachment assembly, according to some embodiments;

FIG. 5 is a perspective view of a fuel tank system, according to some embodiments;

Like reference symbols in the various drawings indicate like elements.

DETAILED DESCRIPTION

As noted above, existing vibration isolation systems may not be optimal in some circumstances.

Figure 1A:
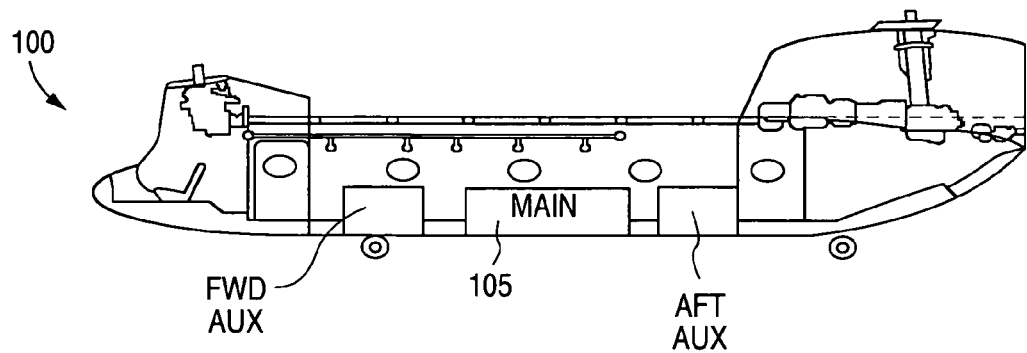
FIG. 1A illustrates an aircraft system with a short range fuel system, according to the prior art.
Figure 1B:
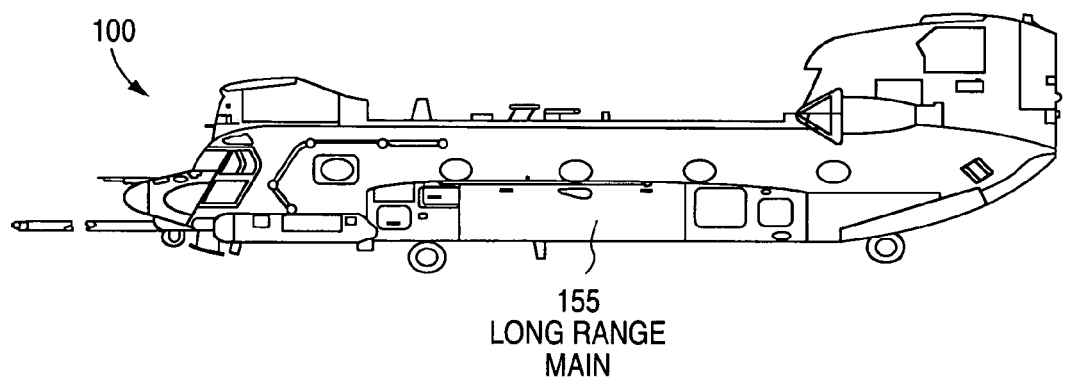
FIG. 1B illustrates an aircraft system with a long range fuel system, according to the prior art.

For example, in a vehicle having an external structure, existing systems may be costly, complex, and heavy. FIGS. 1A and 1B show side views of a CH-47 Chinook aircraft 100 incorporating different vibration isolation systems, according to the prior art. FIG. 1A illustrates an aircraft outfitted with a standard range tank system 105 using a first existing vibration isolation system, while FIG. 1B illustrates an aircraft outfitted with a long range tank system 155, which uses a second existing vibration isolation system.

FIG. 2 shows a cross-sectional side view of portion of a standard range tank system 105. Tank system 105 includes a vibration isolated floor 110. A large number of vibration isolators such as isolator 112 are positioned between a bottom inner surface 111 of tank 105 and vibration isolated floor 110. The isolators are made of an elastomer material with an appropriate durometer (hardness). Aircraft 100 generally includes hundreds of small isolators to the fuel mass from the airframe. Tank system 105 may be mounted to aircraft 100 using a hinge mount 114. The inset of FIG. 2 shows an expanded view of hinge mount 114.

As noted above, a system such as that shown in FIG. 2 has a number of drawbacks. First, the vibration isolation system takes up valuable space in the fuel tank. Second, the system is costly and complex, generally incorporating hundreds of isolators to isolate vibration at the relevant frequencies. Third, the system is difficult to repair/maintain.

FIG. 3A shows a perspective view of a long range tank system 155 incorporating a different vibration isolation system 160 mounted to a portion of an aircraft fuselage 140. FIG. 3B shows vibration isolation system 160, which includes two beams 165 and four vibration isolation assemblies 170. Each of the assemblies 170 includes a machined arm with weights and springs positioned to minimize vibratory shears imparted to beam 165 and fuselage 140, regardless of the weight of the fuel. Vibration isolation system 160 has a number of drawbacks as well. System 160 is relatively heavy, complex, and expensive.

Systems and techniques provided herein may allow for vibration isolation tailored to the vehicle system and its particular vibrational modes, in a simpler, less costly, and less complex way than some available systems.

The systems and techniques described herein may be particularly beneficial for a helicopter system such as a Chinook helicopter. With little fuel in the fuel tanks, the natural frequencies of the airframe are placed properly relative to the rotor excitation frequency. As a result, the airframe vibrations are acceptable. However, for a Chinook without fuel isolation, additional fuel mass causes the frequencies of certain airframe modes to move closer to the rotor excitation frequency, thereby causing high airframe vibrations. By implementing the systems and techniques described herein, the fuel may be sufficiently isolated from the airframe. As a result, the airframe mode frequencies may be substantially insensitive to increased fuel mass.

A mass of the structure may be said to be substantially isolated when vehicle mode frequencies closest to the driving frequency (e.g. airframe mode frequencies closest to the rotor frequency) are at least as far from the driving frequency as the best frequency separation without isolation. For example, as noted above, some helicopters are designed so that the frequencies are properly placed when the fuel tanks are substantially empty. For the un-isolated case, increasing the fuel mass brings some airframe modes closer to the rotor frequency. In this example, the mass of the structure may be said to be substantially isolated when the airframe modes for a full fuel tank are separated from the driving frequency by an amount that is equal to or greater than the frequency separation corresponding to an empty fuel tank without isolation.

FIG. 4A is a cross-sectional top view of a portion of a vehicle 400 including a vehicle body 410 and external structures 420. Vehicle 400 may include a single external structure 420, or may include multiple external structures 420 as shown in FIG. 4A. When there are multiple external structures 420, they may each be the same, or at least one may be different.

External structures 420 are coupled to vehicle body 410 using a plurality of vibration isolation attachment assemblies 430. The configuration and location of attachment assemblies 430 is selected to isolate the mass of external structures 420 (e.g., one or more fuel tanks external to a helicopter fuselage) from the vehicle body 410 (e.g., a helicopter fuselage).

In some embodiments, vehicle body 410 may be an aircraft fuselage, such as a helicopter fuselage. In other embodiments, vehicle body 410 may be a truck body, train body, military vehicle body, or other vehicle body. In some embodiments, external structure 420 may be a fuel tank. In other embodiments, external structure 420 may be a different type of sponson, such as one or more sponsons for weapons, stores, cargo, avionics, etc. Some types of external structures have a mass that changes with time (such as a fuel tank or a sponson including ammunition to be used during vehicle operation), while others have a substantially constant mass.

As illustrated in FIG. 4B, external structure 420 is coupled to vehicle body 410 using a plurality of attachment assemblies. FIG. 4B shows one attachment assembly, according to some embodiments. One or more vibration isolators 433 couple an attachment element 431 of a first surface 411 of vehicle body 410 to an attachment element 432 of a first surface 421 of external structure 420.

Attachment elements 431 and/or 432 may be integrated with the vehicle body 410 and external structure 420, respectively (e.g., one or both may comprise a through hole or a tapped hole), or may comprise an additional element attached to the vehicle body 420 and/or external structure 420 (e.g., a mounting plate).

Vibration isolator 433 comprises one or more elastomer materials shaped and positioned to isolate the mass of the external structure 420. For example, for a helicopter, the shape of vibration isolator 433 may be selected to maintain frequency placement of the fuel mass relative to rotor harmonics, independent of the fuel mass. Vibration isolator 433 may be made of a single durometer (hardness) elastomer material, or may include multiple elastomer materials of different durometers. In some embodiments, the one or more elastomer materials of different durometers may be bonded together to form an integrated vibration isolator 433.

The number of attachment locations may be selected for a particular application, or may be dependent on the system configuration (for example, it may be difficult to design a large number of attachment points for a particular vehicle body configuration and/or external structure configuration). For a helicopter/fuel tank system, a range from four attachment locations to twelve attachment locations (inclusive) may be used, in some embodiments. In other embodiments, more or fewer attachment locations may be used.

For a particular location configuration, the size, shape, and material(s) for each of the isolators may be selected to decouple vibration of the vehicle body from the external structure. For a particular location, one isolator may be used, or multiple isolators may be used. For each isolator, a single elastomer material may be used, or different elastomer materials with different durometers may be used.

As noted above, the systems and techniques herein may be particularly well suited to aircraft, such as helicopters, with external structures. For example, a Chinook helicopter such as the helicopter shown in FIGS. 1A and 1B may have external fuel tanks to be isolated from fuselage to prevent resonance with rotor harmonic excitations.

FIG. 5 shows an external fuel tank 500 that may be used with an aircraft such as a helicopter, according to some embodiments. Fuel tank 500 includes eight attach fittings 510, where four of the attach fittings 510 are proximate to the top of fuel tank 500 and four of the attach fittings 510 are proximate to the bottom of fuel tank 500 (note that only one of the fittings 510 proximate to the bottom of fuel tank 500 is illustrated in FIG. 5). Fuel tank 500 may be attached to an aircraft fuselage using attach fittings 510, as described in more detail below and shown in FIG. 6A.

Although eight attach fittings 510 are illustrated in FIG. 5, there may be more or fewer attach fitting locations of tank 500. For example, locations 520 of FIG. 5 (and corresponding locations proximate to the bottom of tank 500) are additional candidate attach locations of tank 500. At least some of the number and placement of attach locations, as well as the size, shape, and material(s) of the isolators may be tailored for a particular vibration isolation profile, based on the configuration of the vehicle body (e.g., helicopter fuselage), the configuration of the fuel tank, the expected maximum fuel weight, desired vibration isolation characteristics, and/or other factors. For example, for a rotor rotation frequency v, the system may be configured to substantially dampen vibration at frequencies about equal to v and its harmonics.

Figure 6A:
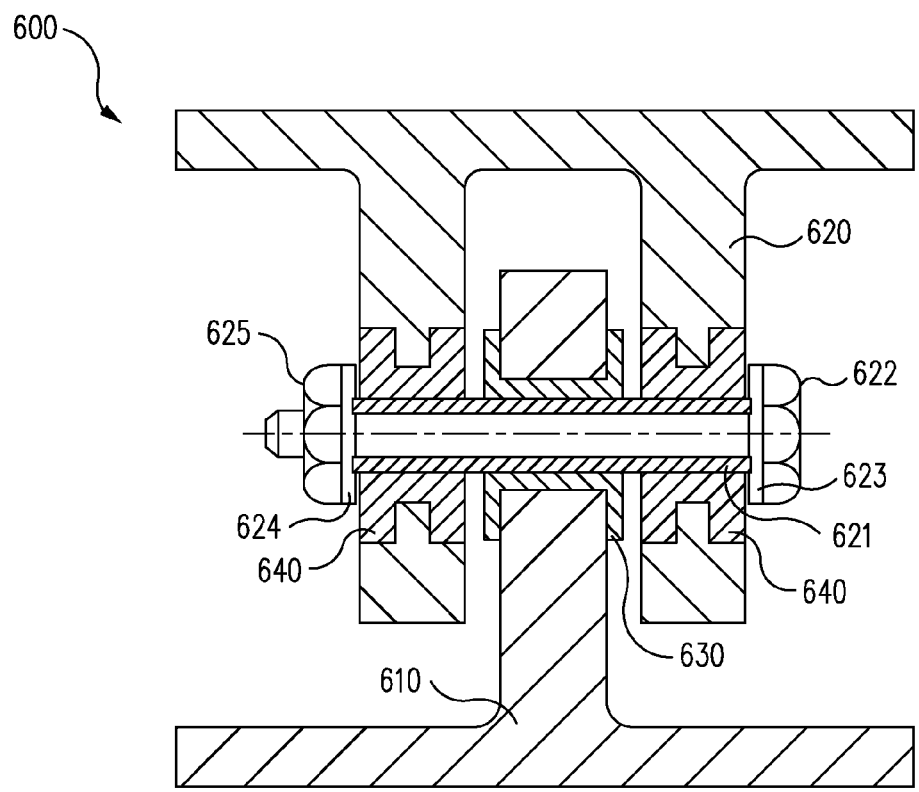
FIG. 6A is a cross-sectional side view of an attachment assembly, according to some embodiments.

FIG. 6A shows a cross-sectional side view of a vibration isolating attachment assembly 600, according to some embodiments. Assembly 600 may be used to attach an exterior fuel tank to a helicopter fuselage.

Assembly 600 includes a tank fitting 610 attached to the fuel tank. Tank fitting 610 may be a single lug fitting with two flanged bushings 630. Assembly 600 further includes a fuselage fitting 620, which may include a clevis fitting. During installation, a sleeve 621 may be inserted through one side of fuselage fitting 620. A bolt 622 may be inserted through a first washer 623 and through sleeve 621. Bolt 622 may be secured using a second washer 624 and a locking nut 625.

Two vibration isolators 640 may be included in assembly 600. Isolators 640 may include grooves to mount to complementary rings in fitting 620. Isolators 640 comprise one or more elastomer materials to decouple the fuel tank from the airframe.

Figure 6B:
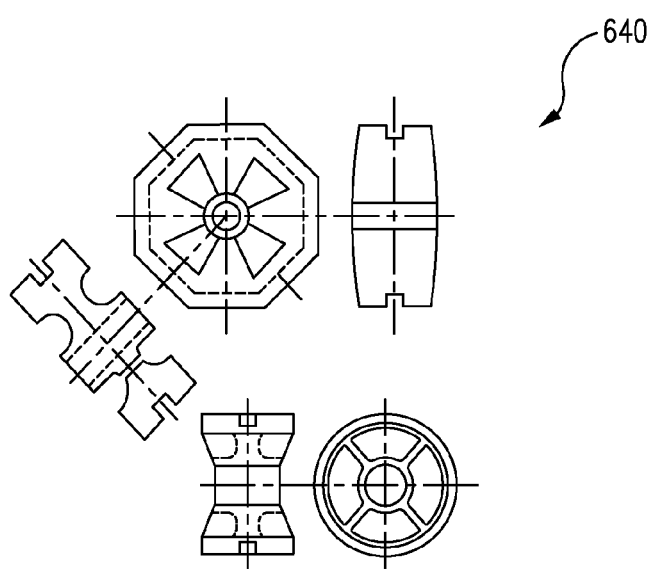
FIG. 6B illustrates different isolator configurations that may be used, according to some embodiments.

A number of shapes and materials may be used for isolators 640. FIG. 6B shows some exemplary isolators 640 that may be used. Many other embodiments are possible.

As noted above, vibration isolating attachment assemblies may be located to isolate particular frequency ranges for particular loads. FIGS. 7A to 7D illustrate exemplary attachment schemes for an embodiment of a fuel tank attachment to a helicopter fuselage.

Figure 7A:
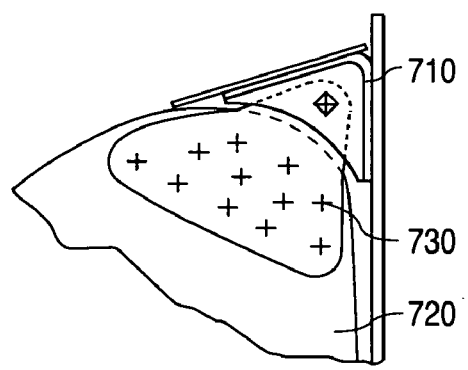
FIGS. 7A to 7D illustrate attachment schemes, according to some embodiments.
Figure 7B:
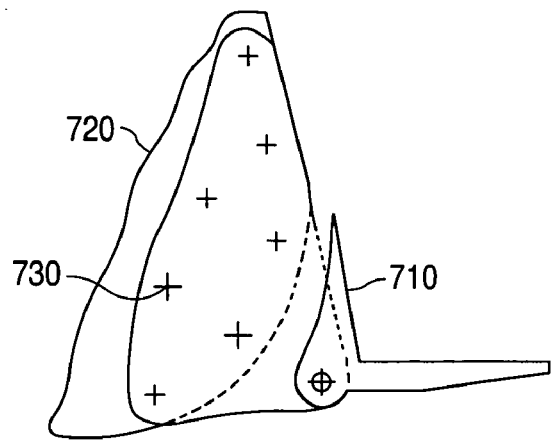
Figure 7C:
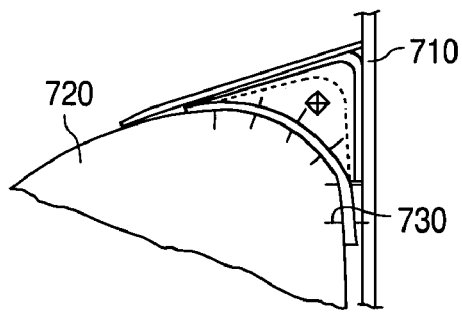
Figure 7D:
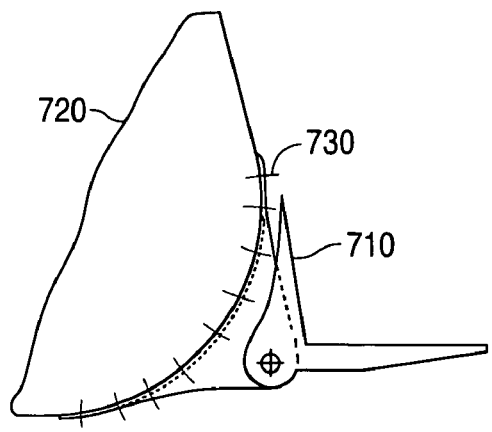

FIG. 7A illustrates a tank end upper attachment for a plurality of locations 730. Vibration isolating attachment assemblies at locations 730 are configured to attach a fuselage 710 to an externally mounted fuel tank 720, while isolating the tank in particular frequency ranges. FIG. 7B shows a tank end lower attachment configuration for a plurality of locations 730. FIG. 7C shows a center upper tank attachment configuration for a plurality of locations 730, while FIG. 7D shows a center lower tank attachment configuration for a plurality of locations 730. Note that the attachment configurations illustrated in FIGS. 7A to 7D are exemplary.

A number of implementations have been described. Although only a few implementations have been disclosed in detail above, other modifications are possible, and this disclosure is intended to cover all such modifications, and most particularly, any modification which might be predictable to a person having ordinary skill in the art. For example, many different designs for individual vibration isolators may be used, as may their location and the mechanisms and configurations used to mount external structures to vehicle bodies. Additionally, many attachment configurations may be used.

Also, only those claims which use the words "means for" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. A vehicle, comprising:
    a vehicle body;
    a structure mounted to the vehicle body exterior to the vehicle body, wherein, in operation, the structure has a first weight at a first time and a second different weight at a second different time; and,
    a plurality of vibration isolator attachment assemblies coupling the structure to the vehicle body at a plurality of pre-selected coupling locations exterior to the structure, wherein each of the plurality of vibration isolator attachment assemblies comprises:
        a vehicle body attachment having coaxial first and second through-holes and defining a clevis fitting;
        a structure attachment having a third through-hole disposed between and coaxial with the first and second through-holes;
        at least one flanged bushing disposed in the third through-hole;
        an elongated clevis pin extending through each of the first and second through-holes and the at least one flanged bushing in the third through-hole; and,
        first and second elastomeric isolators respectively disposed in the first and second through-holes and coupled between the clevis fitting and the clevis pin such that the vehicle body attachment and the structure attachment are non-rigidly coupled to each other through the two elastomeric isolators.

2. The vehicle of claim 1, wherein the vehicle is a helicopter, the vehicle body comprises a helicopter fuselage, and the structure comprises a fuel tank, and wherein the first weight is a weight corresponding to a substantially full fuel tank and wherein the second weight is a weight corresponding to a partially empty fuel tank, and wherein the plurality of vibration isolator attachments are configured to substantially vibration isolate the fuel tank from the fuselage at the first time and the second time.

3. The vehicle of claim 1, wherein the elastomeric isolators comprise a first isolator and a second isolator, and wherein at least one of a shape, size, and material is different for the first isolator and the second isolator.

4. The vehicle of claim 1, wherein a shape, size, and material is the same for the first isolator and the second isolator.

5. The vehicle of claim 1, wherein at least one of the elastomeric isolators comprises a first elastomer material and a second different elastomer material.

6. The vehicle of claim 1, wherein a number of vibration isolator attachment assemblies is in the range from four to twelve.

7. The vehicle of claim 1, wherein a number of vibration isolator attachment assemblies is more than twelve.

8. The vehicle of claim 1, wherein:
    the vehicle comprises a helicopter having a first rotor frequency,
    the vehicle body comprises a helicopter fuselage,
    the structure comprises a fuel tank configured to contain a time-dependent fuel mass in operation, and the plurality of vibration isolator attachment assemblies are configured and positioned to substantially isolate the time-dependent fuel mass from the helicopter fuselage.

9. The vehicle of claim 8, wherein the plurality of vibration isolator attachment assemblies is configured and positioned to substantially isolate the time-dependent fuel mass from the helicopter fuselage when the time-dependent fuel mass corresponds to a substantially full fuel tank and to substantially isolate the time-dependent fuel mass from the helicopter fuselage when the time-dependent fuel mass corresponds to a partially empty fuel tank.

10. The vehicle of claim 1, wherein the vehicle comprises at least one of a truck, a train, a watercraft, and an aircraft.

11. A vibration isolating assembly for attaching a structure to a vehicle body, the assembly comprising:
- a vehicle body attachment having coaxial first and second through-holes and defining a clevis fitting;
- a structure attachment having a third through-hole disposed between and coaxial with the first and second through-holes;
- at least one flanged bushing disposed in the third through-hole;
- an elongated clevis pin extending through each of the first and second through-holes and the at least one flanged bushing in the third through-hole; and,
- first and second elastomeric isolators respectively disposed in the first and second through-holes and coupled between the clevis fitting and the clevis pin such that the vehicle body attachment and the structure attachment are non-rigidly coupled to each other through the two elastomeric isolators.

12. The vehicle of claim 1, wherein the elongated clevis pin comprises a tubular sleeve having a bolt extending coaxially therethrough.

13. The vibration isolating assembly of claim 11, wherein the elongated clevis pin comprises a tubular sleeve having a bolt extending coaxially therethrough.

* * * * *